United States Patent
Nabeiro et al.

(10) Patent No.: US 11,317,755 B2
(45) Date of Patent: May 3, 2022

(54) MACHINE FOR PREPARING BEVERAGES WITH ENHANCED ACCESS TO INTERNAL MACHINE COMPONENTS

(71) Applicant: NOVADELTA—COMÉRCIO E INDÚSTRIA DE CAFÉS S.A., Lisbon (PT)

(72) Inventors: Rui Miguel Nabeiro, Campo Maior (PT); João André De Figueiredo Branco, Moscavide (PT); Marco Filipe Gonçalves Martins, Pedreiras (PT)

(73) Assignee: NOVADELTA—COMÉRCIO E INDÚSTRIA DE CAFÉS S.A., Lisbon (PT)

( * ) Notice: Subject to any disclaimer, the term of this patent is extended or adjusted under 35 U.S.C. 154(b) by 337 days.

(21) Appl. No.: 16/468,027

(22) PCT Filed: Dec. 27, 2017

(86) PCT No.: PCT/PT2017/050035
§ 371 (c)(1),
(2) Date: Jun. 10, 2019

(87) PCT Pub. No.: WO2018/124903
PCT Pub. Date: Jul. 5, 2018

(65) Prior Publication Data
US 2020/0008607 A1    Jan. 9, 2020

(30) Foreign Application Priority Data
Dec. 30, 2016   (PT) .......................................... 109822

(51) Int. Cl.
*A47J 31/40* (2006.01)
*A47J 31/10* (2006.01)
(Continued)

(52) U.S. Cl.
CPC ............... *A47J 31/40* (2013.01); *A47J 31/10* (2013.01); *A47J 31/42* (2013.01); *A47J 31/4403* (2013.01); *A47J 31/4496* (2013.01); *A47J 31/462* (2013.01)

(58) Field of Classification Search
CPC .... A47J 31/44; A47J 31/4403; A47J 31/4407; A47J 31/46
See application file for complete search history.

(56) References Cited

U.S. PATENT DOCUMENTS

| | | | | |
|---|---|---|---|---|
| 5,957,033 A | * | 9/1999 | In-Albon | A47J 31/4403 99/284 |
| 2010/0218687 A1 | * | 9/2010 | Anliker | A47J 31/4403 99/289 R |
| 2011/0192288 A1 | * | 8/2011 | Kroesen | A47J 31/4403 99/286 |

FOREIGN PATENT DOCUMENTS

| | | |
|---|---|---|
| DE | 94 10 129 U1 | 10/1994 |
| EP | 2 946 703 A1 | 11/2015 |
| WO | 2015/022209 A1 | 2/2015 |

OTHER PUBLICATIONS

International Search Report of PCT/PT2017/050035 dated Mar. 22, 2018 [PCT/ISA/210].

(Continued)

*Primary Examiner* — John J Norton
(74) *Attorney, Agent, or Firm* — Sughrue Mion, PLLC

(57) ABSTRACT

The present invention discloses a machine (1) for preparing beverages, in particular aromatic beverages such as for example espresso type coffee, comprising a machine casing (2) that presents at least one first access element (21) on a lateral face of said machine casing (2), adapted so that provides access to the interior region where there are the fluid pressurization means (5), preferentially also a second element access (22) also on a lateral face of said machine (Continued)

Figure 1:
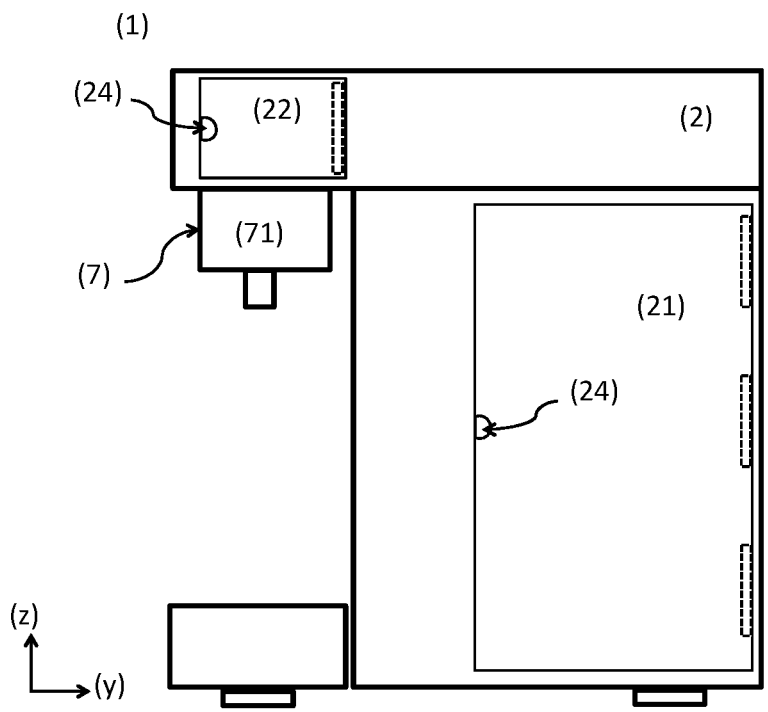

casing (2), adapted so that provides access to the interior region where there is provided a milk frothing device (9), thereby enabling its removal for periodic cleaning in ergonomic manner.

20 Claims, 3 Drawing Sheets

(51) Int. Cl.
*A47J 31/42* (2006.01)
*A47J 31/44* (2006.01)
*A47J 31/46* (2006.01)

(56) References Cited

OTHER PUBLICATIONS

Written Opinion of PCT/PT2017/050035 dated Mar. 22, 2018 [PCT/ISA/237].

\* cited by examiner

MACHINE FOR PREPARING BEVERAGES WITH ENHANCED ACCESS TO INTERNAL MACHINE COMPONENTS

CROSS REFERENCE TO RELATED APPLICATIONS

This application is a National Stage of International Application No. PCT/PT2017/050035, filed Dec. 27, 2017, claiming priority to Portuguese Patent Application No. 109822, filed Dec. 30, 2016.

FIELD OF THE INVENTION

The present invention refers to the field of machines for preparing beverages by means of mixing an edible substance with a pressurized flow, such as for example machines for preparing espresso type coffee.

BACKGROUND OF THE INVENTION

As known in prior art, the generality of machines for preparing aromatic beverages by means of brewing an edible substance, such as espresso-type coffee, tea and similar, comprises flow pressurization devices, notably of pump type or similar. These devices present some sensibility to transport conditions, as well as present maintenance requirements during their operative life span. It is therefore advantageous that the arrangement of said flow pressurization devices provides easy access from outside of the machine casing, without the need of disassembling thereof and thereby providing access to other sensitive components of said beverage preparation machine.

The document EP 2946703 A1 discloses an automatic machine for preparing beverages that presents a first door provided on a frontal region. Said door is adapted so that, when in an open position, provides access to a beverage discharge device, and prevents access to the latter when in a closed position. Said machine further presents a second door adapted so that provides access to a service section, whereby said first and second doors develop in coplanar manner when in a closed position.

Moreover, it is known to provide machine for preparing beverages with milk frothing devices, adapted so that can be attached in removable manner, thereby providing the possibility of cleaning thereof.

The document EP 2875761 A1 discloses a machine for preparing beverages of the type of the present invention with a frontal door that provides access to a milk frothing device.

The document DE 20 2009 004756 U1 discloses a machine for preparing beverages whereby a milk frothing device is adapted so that can be pushed and thereby fitted in removable manner into a corresponding machine part. In particular, it is in this case preferred when the push disposition is provided with a box corner region. Moreover, it is preferred when said push disposition presents a protruding element for better handling thereof. However, said push disposition is a piece separated from the machine casing and presents openings for passing connection tubes on the exterior side of the casing, so that result fragility points exposed to shocks and other types of accidental damages.

None of the aforementioned devices presents a solution in view of the configuration and disposition of means of access to particular components of a machine for preparing beverages.

SUMMARY DESCRIPTION OF THE INVENTION

The objective of the present invention is to provide a machine for preparing beverages with possibility of improved access to several operational components inside of the casing of said machine, both by authorized technicians, requiring the use of special tools, and by normal users, without requiring the use of tools.

This objective is attained according to the present invention by means of a machine for preparing aromatic beverages, such as for example espresso type coffee and similar, comprising a machine casing a flow pressurization means inside of said machine casing, in particular two flow pressurization devices, for example of the pump type or similar, and providing access by technicians for assembling and disassembling of said flow pressurization devices, without the need for disassembling the whole casing and without thereby providing access to other sensitive components of said machine, such as the control device thereof.

According to an inventive aspect, said machine presents a casing with casing walls that develop along the side faces and a posterior face, whereby at least one of said side faces and posterior face presents at least one first access element to said flow pressurization means, but does not provide access to control means of said machine.

It is preferred when the machine for preparing beverages is adapted so that can heat up at least one processing fluid to a temperature of at least 50° C., preferentially to at least 80° C., and pressuring up a processing fluid up to a pressure of at least 2 bar, preferentially at least 8 bar.

The machine for preparing beverages according to the present invention can be used for preparing coffee, milk, tea and similar, and water can be used as processing fluid in that preparation.

It is preferred when the beverage preparation machine further provides milk frothing, in particular by means of flow mixture means that comprise a milk frothing device by means of mixing a milk flow with a pressurized water vapour flow supplied by one fluid pressurization device, preferentially one of the two fluid pressurization devices comprised in said machine.

It is preferred when said milk frothing device is provided as a removable part arranged adjacent to an collection device of edible substance, in particular a brewing device, and directly above a beverage discharge disposition.

According to another inventive aspect, said machine casing further comprises a second access element, also arranged on a side face of said machine casing, and adapted so that provides only access to a milk frothing device, so that said milk frothing device can be disassembled for cleaning and again assembled without the need of any tool for such purpose.

According to another inventive aspect, said discharge means comprise a discharge casing that presents a respective casing opening confined by a side wall and a base wall that includes discharge passageways, whereby said discharge casing comprises retention elements on the perimeter region of casing opening, adapted so that provide a removable retention of said discharge casing on said machine casing, without requiring the use of tool for such purpose.

It is preferred when said discharge means comprise a discharge casing that presents a respective casing opening confined by a side wall and a base wall that includes at least one, preferentially two discharge passageways disposed on a side opposite to said casing opening, whereby said discharge casing comprises retention elements, preferentially arranged in substantially mutually opposite positions on the perimeter region of said casing opening, whereby said retention elements are adapted so that provide a removable retention along a vertical longitudinal plane of said discharge casing on said machine casing, so that said casing is confined above by a downwards oriented portion of said machine casing when retained thereon by said retention elements, whereby said retention elements are adapted so that can provide retention on said machine casing and release therefrom by means of manual actuation thereof without requiring the use of tools for such purpose.

It is preferred when said discharge casing is disposed with said casing opening oriented upwards when on a position of retention on said machine casing, thereby completely confining the flow conduction elements inside of said discharge casing relative to the exterior thereof, and when said discharge casing further comprises at least one flow connection of tubular type adapted for discharging of milk and provided in connection and/or extension of one of said discharge passageways, whereby said flow connection is preferentially provided as a single piece with said discharge casing so that said flow connection can be removed for cleaning together with said discharge casing.

It is preferred when said discharge means present a respective discharge casing provided so that can be swivelled around a horizontal axis between a retention position where said discharge casing is at a substantially horizontal position, and a non-retention position where it is at an oblique position.

It is preferred when said discharge casing is adapted so that can be removed from corresponding part of retention at said machine casing according to at least one of: a downwards rotation movement and, optionally, a frontwards displacement movement away from said machine casing; and, an at least approximately vertical downwards movement away from said machine casing, so that can be again retained on the corresponding part of retention at said machine casing by means of respectively reverse movements.

It is preferred when said discharge casing is adapted so that can be retained in removable manner on said machine casing by means of a screw-like connection.

It is preferred when said discharge casing is adapted so that can be retained in removable manner on said machine casing by means of two retention elements that provide at least one of: conduction guides of discharge casing for retention thereof on the corresponding part of retention at said machine casing; and, support of connections of removable type without requiring the use of tools, including at least one of male-female connections, such as for example of the pressure-fitting type, and connections between materials, such as for example of the magnetic type.

It is preferred when said discharge casing presents retention elements adapted so as to provide to the user the tactile perception of correct retention of said discharge casing on the corresponding part of retention at said machine casing.

It is preferred when said discharge casing presents position apprehension elements, for example contact sensors of the electric type, magnetic type, and similar, adapted so as to provide data to control means relating to the correct retention of said discharge casing in the corresponding part of retention at said machine casing.

It is preferred when at least one of said machine casing and said discharge means, preferentially said discharge casing, presents information display elements adapted so as to display information to a user relating to the correct retention of said discharge casing in the corresponding part of retention at said machine casing.

LIST OF FIGURES

The invention shall hereinafter be explained in greater detail based upon schematic representations of preferred embodiments and in the attached Figures.

Figure 2:
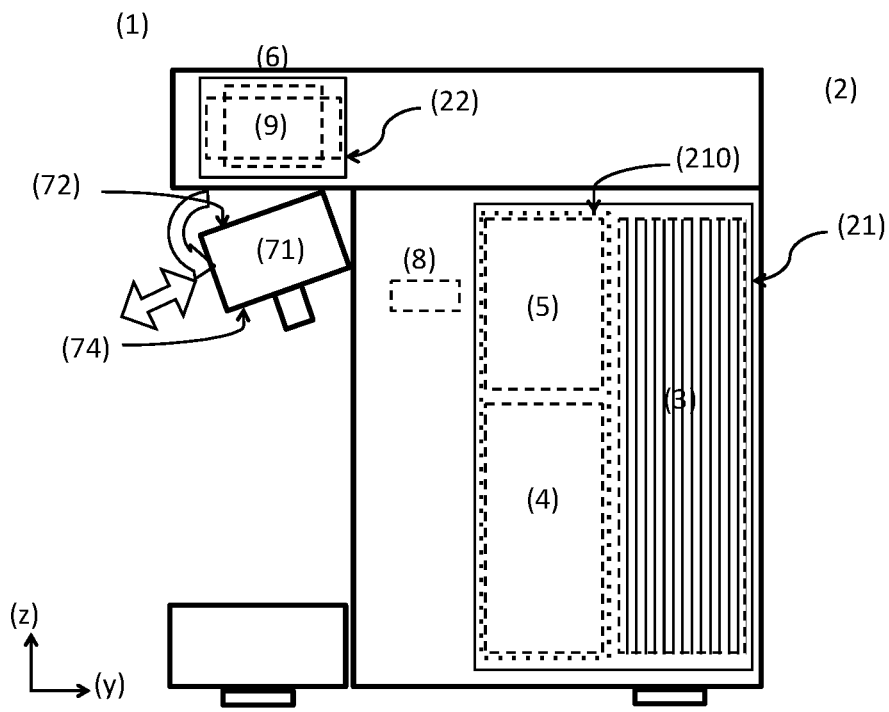
Figure 3:
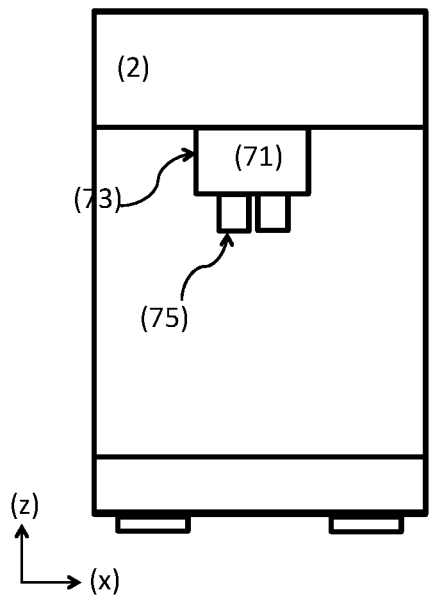
Figure 3:
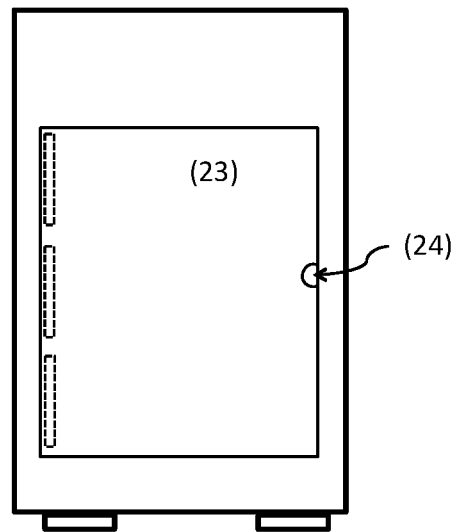
Figure 4:
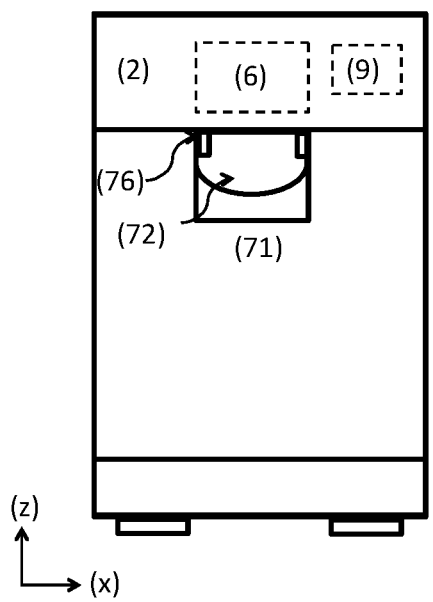
Figure 4:
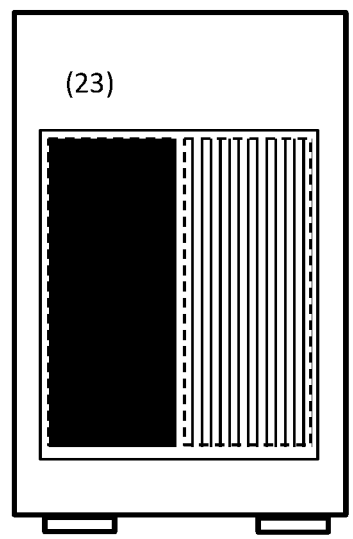
Figure 5:
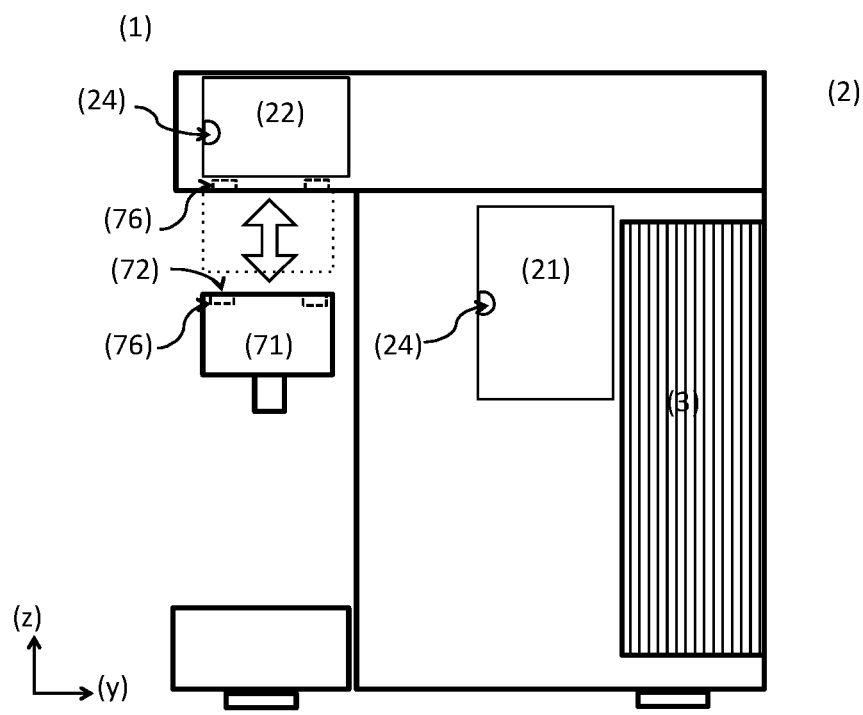
Figure 6:
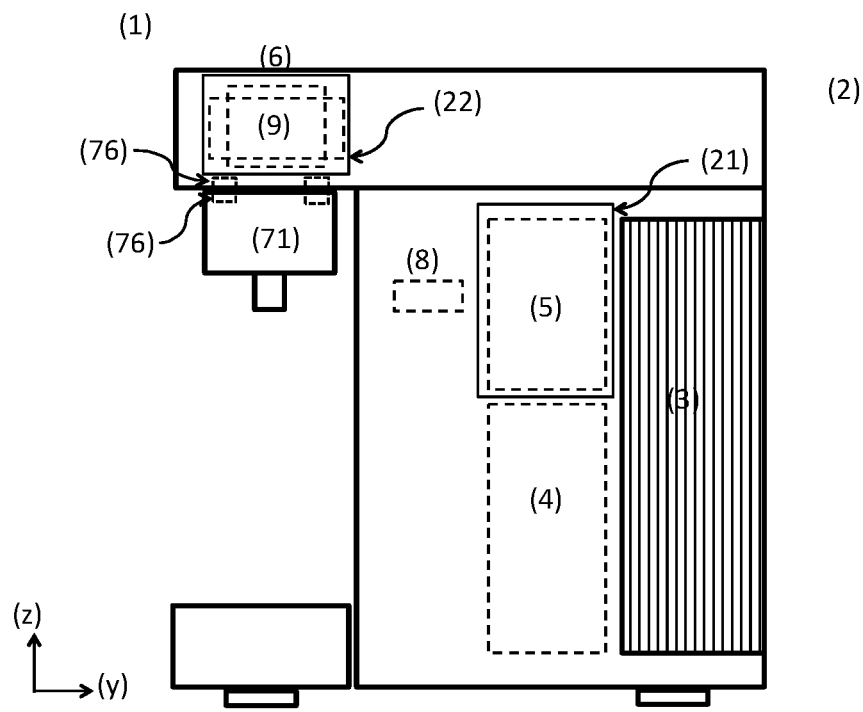

The Figures show:

FIG. 1: first side view of a first embodiment of a machine (1) according to the invention;

FIG. 2: second side view of the embodiment of machine (1) according to FIG. 1;

FIG. 3: front and posterior views of the embodiment of machine (1) according to FIG. 1;

FIG. 4: side view of the embodiment of machine (1) according to FIG. 1, with the discharge casing (7) on an initial opening position;

FIG. 5: first side view of a first embodiment of a machine (1) according to the invention, with the discharge casing (7) on an initial open position;

FIG. 6: second side view of a first embodiment of a machine (1) according to FIG. 5.

DESCRIPTION OF EMBODIMENTS OF THE INVENTION

FIGS. 1 and 2 represent a machine (1) for preparing beverages according to the present invention, adapted for preparing aromatic beverages, such as for example espresso-type coffee, tea and similar, by means of brewing a respective single portion in a brewing chamber by means of an upstream pressurized fluid flow, so as to obtain a beverage downstream.

This type of machines is known from an expert in the field so that it is herewith abdicated from a more detailed description of respective components.

According to a first inventive aspect, said machine (1) presents a machine casing (2) with side and posterior walls, whereby at least one of said side and posterior walls of said machine casing (2) presents at least one of a respective first and second access elements (21, 22) to the interior of casing (2), whereby at least a first access element (21) provides access to the interior region of said casing (2) where there are disposed said fluid pressurization means, and optionally at least one of said fluid storage means (3), but not to said control means (8), so that said fluid pressurization means (5) can be assembled and disassembled from respective fluid connections internal to said casing (2) without disassembling said casing (2).

For safety reasons, it is preferred when the access to said fluid pressurization means (5) further requires the removal of an interior access element (210), for example in the form of a plate or similar (identified in the drawing by the dotted line), that is accessible by means of opening of said first access element (21) and that presents removable attachment means, whereby said attachment means are adapted so that the removal of attachment of said interior access element (210) preferentially requires the use of a tool for such purpose.

It is preferred when said side walls of casing (2) present a first and second access elements (21, 22), adapted so that provide access to different components, whereby said first and second access elements (21, 22) are preferentially provided on the same side wall but with at least one of different shape and different dimension.

It is further preferred when said posterior wall of machine casing (2) presents a third access element (23) adapted so that provides access to said fluid storage means (3).

As can be better observed in FIG. 2, said first access element (21) provides access to the fluid heating means and to the fluid pressurization means a (5), as well as to at least one of the fluid reservoirs (3), for example a milk reservoir.

It is preferred when said fluid pressurization means (5) comprise two pressurization devices (51, 52) adapted so as to provide different flow pressure values, whereby one is dedicated to water pressurization and the other is dedicated to water vapour pressurization, whereby said first and second pressurization devices (51, 52) are disposed next to each other and are adapted so that can be directly accessed from a side wall of said casing (2) via said first access element (21).

It is thus advantageously provided an access to fluid pressurization means (5) by technicians, without the need of removing the while machine casing (2) and of touching in other internal components of said machine (1).

As can be better observed in FIG. 2, the machine (1) in this case further comprises a milk frothing device (9) adapted for mixture of the flow originating from said second reservoir (32), in particular a milk flow, with a flow generated by said second pressurization device (52), in particular a vapour flow, whereby said milk frothing device (9) is arranged inside of said casing (2) on a region lateral relative to said collection means (6).

Said milk frothing device (9) requires periodic maintenance by the user, in particular cleaning thereof. Said second access element (22) provides access for this purpose without requiring the use of tools, and without providing access to other internal components of machine (1).

Moreover, according to another preferred embodiment, said access elements (21, 22, 23) present a respective actuation part (24) adapted so as to at least indicate an appropriate region for handling the opening thereof, preferentially providing support to handling of opening thereof, including for actuation of an attachment device that does not require the use of a tool, such as for example a pressure-fitting device or a magnetic device. Moreover, it is preferred when said access elements (21, 22, 23) present a similar actuation part (24), whereby said actuation part (24) is preferentially adapted so as to provide support to a finger.

The machine (1) further includes discharge means (7) that comprise a discharge casing (71) that presents a respective casing opening (72) confined by a side wall (73) and a base wall (74) that includes at least one, preferentially two passageways (75), developing opposite to said discharge casing (72).

Said discharge casing (71) is disposed with said casing opening (72) oriented upwards so as to confine with said casing (2) when in a closed position, thereby completely confining the flow conduction elements inside of the discharge casing (71) relative to the exterior thereof. Moreover, said discharge casing (71) further comprises at least one flow connection of tubular type adapted for discharging milk and provided in connection and/or extension of one of said discharge passageways (76), whereby said flow connection is preferentially provided as a single piece with said discharge casing (71) so that said flow connection can be removed for cleaning together with said discharge casing (71).

There is in this case also the issue of the possibility of expedite access to the interior of said discharge casing (71), in particular for periodic cleaning of the associated with the flow of milk.

According to an inventive aspect, said discharge casing (71) is adapted so that can be removed from a corresponding part of said machine casing (2) according to at least one of: a downwards rotation movement and, optionally, a frontwards displacement movement away from the machine casing (2); an at least approximately vertical downwards movement away from the machine casing (2), and so that can be again retained in the corresponding part of said machine casing (2) by means of respectively reverse movements.

According to a preferred embodiment (not represented in the drawings) said discharge casing (71) is adapted so that can be retained in removable manner on said casing (2) by means of a screw-like connection.

FIG. 2 further represents a first embodiment of the movement of removal of said discharge casing (71). In particular, said discharge means (7) present a respective discharge casing (71) provided so that can be swivelled around a horizontal axis between a closed position where it is in a substantially horizontal position and an open position where it is in an oblique position.

As illustrated in FIGS. 1 and 2, said discharge casing (71) can be retained in respective part of machine casing (2) by means of a downwards rotation movement, as represented in the left-hand side drawings of FIGS. 3 and 4.

In particular, according to an inventive aspect, said discharge casing (71) comprises retention elements (76) in the perimeter region of the casing opening (72), preferentially disposed in substantially mutually opposing positions and adapted so that provide a removable retention of said discharge casing (71) on said casing (2), without requiring the use of tools for such purpose.

It is preferred when said discharge casing (71) is adapted so that can be retained in removable manner on said casing (2) by means of two retention elements (76) that provide at least one of: conducting guides of discharge casing (71) for retention in corresponding part of said machine casing (2); support to connections of removable type without requiring the use of tools, including at least one of: male-female connections, such as for example of the pressure-fitting type, and connections between materials, such as for example of the magnetic type.

It is herewith provided an easy and ergonomic disassembly and assembly of said discharge casing (71).

As represented on the right-hand side drawings of FIGS. 3 and 4, said posterior wall of casing (2) can further present a third access element (23) on the posterior wall of machine casing (2), adapted so that provides direct access to fluid storage means (3).

According to another preferred embodiment, said fluid storage means (3) comprise a first reservoir (31) for water and a second reservoir (32) for milk, whereby said first and second reservoirs (32) are provided with similar shape and dimensions, and optionally inside of the machine casing (2).

FIGS. 5 and 6 represent a second embodiment of a machine (1) according to the present invention, whereby said first access element (21) is adapted so that only provides access to said fluid pressurization means (5).

As represented, the fluid storage means (3) are provided on an exterior part of the machine casing (2).

It is preferred when said access elements (21, 22, 23) are provided as elements that provide access to the interior of casing (2) by means of at least one of: an actuation movement, including as at least one of a door-like element that can swivel around an axis, and of a curtain-like element that can be rolled-up or folded-up on a respective support associated with said machine casing (2), and an operation of retention removal of said access element (21, 22, 23), including at least one of: male-female connections, such as for example of the pressure-fitting type, and connections between materials, such as for example of the magnetic type. Moreover, it is preferred when said access elements (21, 22, 23) are adapted so that be opened up and closed without using a tool for such purpose.

Moreover, FIGS. 5 and 6 represent a second embodiment of the retention of the discharge casing (71) on a corresponding part of the machine casing (2).

In particular, the discharge casing (71) presents retention elements (76) adapted so that can be actuated by means of a vertical movement and a removable attachment, for example by means of pressure-fitting and/or by means of magnetic elements.

It is preferred when said discharge casing (71) presents retention elements (76) adapted so as to provide to the user a tactile perception of the correct retention of said discharge casing (71) on a corresponding part of machine casing (2).

It is preferred when said discharge casing (71) presents position apprehension elements, for example contact sensors of electric type, magnetic type, and similar, adapted so as to provide data to said control means (8) relating to the correct retention of said discharge casing (71) on a corresponding part of machine casing (2).

It is preferred when at least one of said machine casing (2) and said discharge means (7), preferentially said discharge casing (71), presents information display elements adapted so as to display information to a user relating to the correct retention of said discharge casing (71) on a corresponding part of machine casing (2).

These elements advantageously provide a more reliable and ergonomic use of said discharge casing (71).

The invention claimed is:

1. A machine (1) for preparing beverages, including espresso coffee, comprising:
    a machine casing (2) that presents side, top and posterior walls, thereby configuring a parallelepiped form,
    a fluid storage (3) provided on a posterior part of said machine (1),
    a fluid heater (4) and fluid pressurizer (5) provided inside of said casing (2),
    a discharge means (7) associated with said machine casing (2) and presenting passageways for discharge of beverages,
    a fluid collector (6) provided on a front part of the machine (1) above said discharge means (7), and adapted for collecting a single portion of edible substance, and
a control means (8) provided inside of said machine casing (2) and adapted to actuate said fluid heater (4) and fluid pressurizer (5),
    wherein at least one of said side and posterior walls of said machine casing (2) presents at least a first and a second access element (21, 22) adapted to provide access to the interior of said machine casing (2),
    whereby at least the first access element (21) provides access to the interior of said machine casing (2) where there is arranged said fluid pressurizer (5), but not said control means (8), so that said fluid pressurizer (5) can be installed and replaced on respective fluid connections internal to said casing (2) without removal or disassembly of said casing (2).

2. The machine according to claim 1,
    wherein one of said side walls of said machine casing (2) presents said first and second access elements (21, 22), each being adapted to provide access to a respective confined space inside of said casing (2), without access to further spaces inside of said casing (2), and adapted to contain different components of said machine (1),
    whereby said first and second access elements (21, 22) are provided on the same side wall of said casing (2) but with at least one of a different volume shape and a different volume dimension.

3. The machine according to claim 1,
    wherein said posterior wall of machine casing (2) presents a third access element (23) adapted to provide access only to said fluid storage (3) inside of said machine casing (2), and to no other component or space inside of said machine casing (2).

4. The machine according to claim 3,
    wherein said access elements (21, 22, 23) are adapted to be actuated by either being moved or being attached relative to said machine casing (2), thereby providing access to respective confined spaces and components inside of said machine casing (2).

5. The machine according to claim 4,
    wherein said access elements (21, 22, 23) can be actuated to close and open thereby providing access to a respective confined space inside of said casing (2) by means of at least one of:
    a movement of said access element (21, 22, 23) relative to said machine casing (2), said access element (21, 22, 23) being provided as at least one of: a door element that can rotate around a respective axis, and a curtain element that can roll or fold relative to a respective support, and
    a retention of said access element (21, 22, 23) relative to said machine casing (2), said access element (21, 22, 23) being provided with at least one male-female-type connection, whereby said access elements (21, 22, 23) are adapted to be opened and closed without a tool.

6. The machine according to claim 5,
    wherein the male-female type connection comprises at least one of a pressure-fitting device or a magnetic attachment device.

7. The machine according to claim 4,
    wherein the access elements (21, 22, 23) are opened and closed, supported by a connection to said machine casing (2).

8. The machine according to claim 3,
    wherein said access elements (21, 22, 23) are provided in at least one of said side walls of said casing (2) and are adapted to be opened by means of a swivelling movement around a vertical axis, in manner of a door opening in the direction from a front part towards a posterior part with relation to said casing (2), and to be closed by a reverse movement, thereby providing improved ergonomics in relation to a position of a user of the machine (1).

9. The machine according to claim 3, wherein each of said access elements (21, 22, 23) presents a respective actuation part (24) adopted to at least indicate a region thereof appropriate for handling a respective opening relative to said machine casing (2), and to provide support for handling a respective opening, including for actuation of an attachment device that does not require the use of a tool.

10. The machine according to claim 9,
    wherein the attachment device comprises at least one of a pressure-fitting device or a magnetic attachment device.

11. The machine according to claim 3,
wherein each of said access elements (21, 22, 23) presents an actuation part (24), whereby said actuation part (24) is adapted so as to provide support for a user's finger.

12. The machine according to claim 3,
wherein said access elements (21, 22, 23) present a trapezoidal shape and a dimension that corresponds to at least most of the height and at least most of the width of respective regions of side walls and posterior wall.

13. The machine according to claim 1,
wherein said first access element (21) provides access to an interior access element (210), provided in the form of a plate, arranged so that the access to the interior space that contains said fluid pressurizer (5) further requires the removal of said interior access element (210),
whereby said interior access element (210) is provided so that removal thereof requires the use of a tool.

14. The machine according to claim 1,
wherein said fluid pressurizer (5) comprises one or both of a first and a second fluid pressurization device (51, 52), arranged on a central region of the machine casing (2) along a depth thereof, so that a weight of said fluid pressurizer (5) is on a central region of a volume defined by said machine casing (2), relative to the depth thereof.

15. The machine according to claim 1,
wherein said fluid pressurizer (5) comprises two pressurization devices (51, 52) adapted to provide different flow pressure values,
whereby said first and second pressurization devices (51, 52) are arranged next to each other and are adapted to be directly accessed by means of said first access element (21) from one of the side walls of said casing (2).

16. The machine according to claim 15,
wherein the machine further comprises first and second reservoirs as well as a milk frothing device (9) adapted for mixture of a milk flow originating from said second reservoir (32), with a vapour flow generated by said second pressurization device (52),
whereby said milk frothing device (9) is arranged inside of said casing (2) on a region lateral relative to said fluid collector (6).

17. The machine according to claim 16,
wherein the second access element (22) is disposed on a top region of said casing (2) above said discharge means, and adapted to provide access only to said milk frothing device (9) by means of manual actuation of said second access element (2), so that said milk frothing device (9) can be uninstalled for cleaning and again installed, without requiring any tool for such purpose.

18. The machine according to claim 1,
wherein said fluid storage (3) is provided inside of said casing (2) and occupies least part of the width of the interior space confined by said casing (2) in the posterior part of said machine (1), and
wherein said first access element (21) further provides access to said fluid storage (3).

19. The machine according to claim 18,
wherein said fluid storage (3) occupies at least most of the width of the interior space.

20. The machine according to claim 1,
wherein said fluid storage (3) comprises a first reservoir (31) for collecting and supplying water, and a second reservoir (32) for collecting and supplying milk.

* * * * *